350-345

4/8/80 XR 4,196,581 SR

United States Patent [19]

Nemoto

[11] 4,196,581

[45] Apr. 8, 1980

[54] LIQUID CRYSTAL WRISTWATCH

[75] Inventor: Isao Nemoto, Suwa, Japan

[73] Assignee: Kabushiki Kaisha Suwa Seikosha, Tokyo, Japan

[21] Appl. No.: 823,776

[22] Filed: Aug. 11, 1977

[30] Foreign Application Priority Data

Aug. 11, 1976 [JP] Japan .............................. 51-95619

[51] Int. Cl.[2] ...................... G04B 19/30; G02F 1/13

[52] U.S. Cl. ............................. 368/227; 350/345; 368/242

[58] Field of Search ............... 58/50 R, 126 R, 127 R; 350/338, 345; 240/6.43

[56] References Cited

U.S. PATENT DOCUMENTS

| | | | |
|---|---|---|---|
| 3,712,047 | 1/1973 | Girard | 58/50 R |
| 3,864,905 | 2/1975 | Richardson | 58/50 R |
| 3,983,689 | 10/1976 | Burke et al. | 58/50 R |
| 3,984,176 | 10/1976 | Hirai et al. | 350/160 LC |
| 4,026,103 | 5/1977 | Ichikawa et al. | 58/50 R |
| 4,043,636 | 8/1977 | Eberhardt et al. | 350/160 LC |

*Primary Examiner*—Vit W. Miska

*Attorney, Agent, or Firm*—Blum, Kaplan, Friedman, Silberman & Beran

[57] ABSTRACT

A liquid crystal display electronic wristwatch having a lamp therein to illuminate the liquid crystal display mounted in the watch case beneath the display panel so as to overlap with the display and cover glass in plan view. Wristwatches constructed and arranged in accordance with the invention may be of reduced size without having to reduce the size of the display panel.

3 Claims, 5 Drawing Figures

LIQUID CRYSTAL WRISTWATCH

BACKGROUND OF THE INVENTION

This invention relates generally to a liquid crystal display electronic wristwatch, and in particular to an improved liquid crystal display electronic wristwatch having a lamp therein. In conventional liquid crystal display wristwatches, a lamp is included in the watch case adjacent to a reflection plate which is positioned beneath the liquid crystal display. A lamp is necessary because conventional liquid crystal displays are difficult to see by the nature of the display and particularly difficult to see in dark locations. The lamp overcomes this difficulty, however, incorporation of a lamp into a liquid crystal wristwatch has increased the overall size of the wristwatch. This increase in size has prevented liquid crystal electronic wristwatches from competing effectively with smaller size analog wristwatches. Accordingly, it would be desirable to overcome these design difficulties without having to reduce the size of the display.

SUMMARY OF THE INVENTION

Generally speaking, in accordance with the invention, a liquid crystal display electronic wristwatch is provided which overcomes many disadvantages of prior conventional liquid crystal display wristwatches. The liquid crystal display electronic wristwatch constructed and arranged in accordance with the invention includes a lamp positioned in the watch case beneath the display panel so as to overlap with the cover glass, display panel and reflection plate in plan view thereby providing a wristwatch of comparable display size to conventional wristwatches, yet having an overall smaller dimension.

Accordingly, it is an object of this invention to provide an improved liquid crystal display elecronic wristwatch.

Another object of the invention is to provide a liquid crystal display electronic wristwatch of improved design.

A further object of the invention is to provide an improved liquid crystal display electronic wristwatch having a lamp therein.

Still another object of the invention is to provide an improved liquid crystal display electronic wristwatch wherein the lamp is positioned beneath the liquid crystal display panel in plan view.

Still a further object of the invention is to provide an improved liquid crystal display electronic wristwatch having a lamp therein positioned beneath a reflection plate adapted to illuminate the liquid crystal display.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
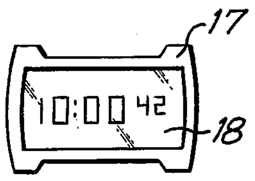
FIG. 1 is a plan view showing a liquid crystal display electronic wristwatch constructed and arranged in accordance with the invention.
Figure 2:
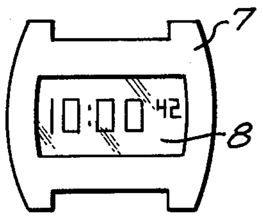
FIG.2 PRIOR ART
FIG. 2 is a plan view of a conventional liquid crystal display electronic wristwatch.

In FIG. 2, a watch case 7 and a cover glass 8 positioned over the liquid crystal display panel in a conventional liquid crystal display electronic wristwatch is shown. In FIG. 1, a liquid crystal display electronic wristwatch constructed in accordance with the invention is shown with a cover glass 18 of comparable size to cover glass 8 of the conventional watch positioned in a watch case 17 of substantially reduced size. The wristwatches of FIGS. 1 and 2 each have a lamp therein in order to improve visibility of the display. The overall reduction in size can readily be seen. The method of achieving this reduction in overall size of wristwatch obtainable in accordance with the invention without reducing the size of the display area will be detailed below.

Figure 3:
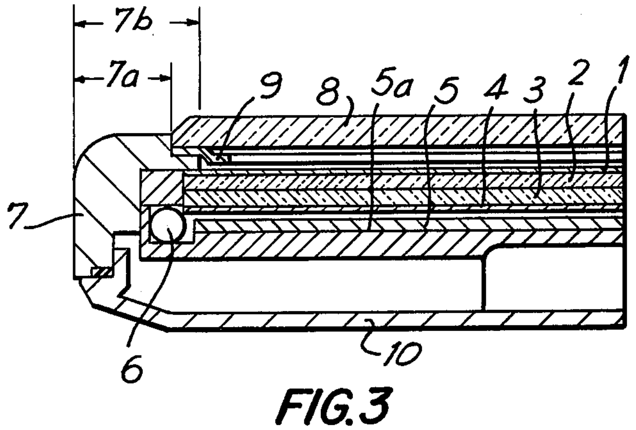
FIG.3 PRIOR ART
FIG. 3 is a partial corss-sectional view of the conventional liquid crystal display wristwatch of FIG. 2.

In FIG. 3, a partial cross-sectional view of the conventional wristwatch of FIG. 2 is shown. Watch case 7 is formed with an inwardly facing peripheral flange formed with an inwardly facing lip on its lower surface for securing cover glass 8. A parting plate 9 is positioned compressively between watch case 7 and cover glass 8 for defining the visible portion of the liquid crystal display. A case back 10 is mounted releasably in watch case 7 to define an interior chamber for housing the liquid crystal display and watch mechanism (not shown). The liquid crystal display is a conventional display formed from an upper glass plate 2 and a lower glass plate 3 containing a conventional liquid crystal material (not shown) sealed between glass plates 2 and 3. An upper polarization plate 1 is provided across the top surface of upper glass 2 and a lower polarization plate 4 is positioned across the lower surface of lower glass 3. The liquid crystal display panel is positioned in the interior of watch case 7 beneath a portion of case lip by suitable securing means and is further positioned below cover glass 8 and parting plate 9.

A reflection plate 5 having a lower reflection surface 5*a* is positioned in watch case 7 so as to be below the display panel. A lamp 6 is positioned inside watch case 7 adjacent to reflection plate 5 and does not overlap glass plates 2 and 3 of the liquid crystal display when viewed in plan view. When lamp 6 is illuminated, light passes through reflection plate 5 and is reflected toward a viewer through the liquid crystal panel by reflection surface 5*a*. This conventional construction requires a minimal dimension shown as *7a* from the outer edge of watch case 7 to the outer edge of cover glass 8 and a dimension of *7b* from the outer edge of watch case 7 to the innermost edge of the lip.

Figure 4:
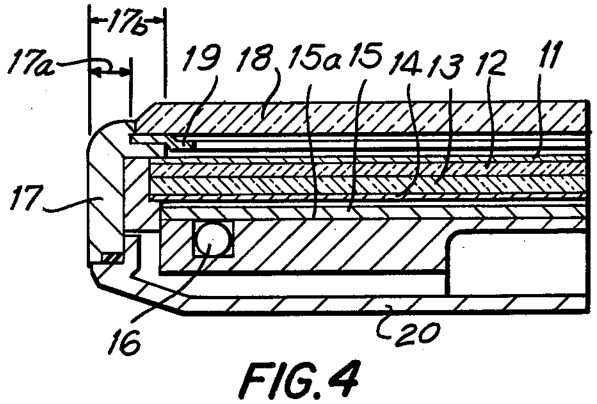
FIG. 4 is a partial cross-sectional view of the liquid crystal display wristwatch of FIG. 1.

Referring now to FIG. 4, a partial cross-sectional view of a liquid display electronic wristwatch having a lamp therein constructed and arranged in accordance with the invention is shown. Watch case 17 is formed with an inwardly facing upper peripheral flange formed with an inwardly extending lip on its lower surface for receiving cover glass 18. A parting plate 19 is compressed between cover glass 18 and the watch case lip for defining the visible portion of the liquid crystal display. A case back 20 is positioned releasably in watch case 17 to define an internal chamber for receiving the display panel and watch mechanism (not shown).

A conventional liquid crystal display panel formed with an upper glass plate 12 and a lower glass plate 13 having a liquid crystal material (not shown) sealed therebetween is mounted below cover glass 18 and parting plate 9 in watch case 17. An upper polarization plate 11 is positioned across the top surface of upper glass 12 and a lower polarization plate 14 is positioned across the lower surface of lower glass 13 to define the liquid crystal display panel.

A reflection plate 15 having a lower reflection surface 15*a* is positioned in the interior of watch case 17 below the liquid crystal display panel. A lamp 16 is positioned in the interior of watch case 17 beneath reflection plate 15 and the display panel when viewed in plan view. Reflection plate 15 is formed to allow light emitting from lamp 16 to pass therethrough and be reflected by reflection surface 15*a* to pass through the liquid crystal display panel thereby illuminating the display panel.

Figure 5:
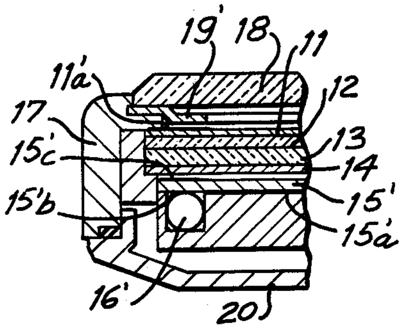
FIG. 5 is a fragmentary cross-sectional view of an alternate embodiment of the liquid crystal display wristwatch of FIG. 1.

In another embodiment of the invention illustrated in FIG. 5, reflection plate 15' is modified to spread light emanating from lamp 16' more effectively over the liquid crystal display panel. A portion 15'*b* of lower reflection surface 15'*a* corresponding to the position of lamp 16' is formed to be transparent to allow light emanating from lamp 16' to pass therethrough. Further, the upper surface of reflection plate 15' corresponding to the position of lamp 16' may be formed with a downwardly facing opaque reflection surface 15'*c*.

In addition, an opaque finish 11'*a* may be applied to a portion of the display panel corresponding to the position of lamp 16'. Thus, light emitting from lamp 16' will not illuminate the display panel immediately above lamp 16', but spread out and be reflected to lower reflection surface 15'*a* which in turn reflects the light through the display panel so as to illuminate the full surface of the display panel. In this latter embodiment of the invention, when the display panel is viewed from the upper surface of watch case 17 light emanating from lamp 16' will be seen evenly across the entire panel. This effect can also be achieved by forming parting plate 19' so that when it is positioned in watch case 17 it overlaps lamp 16' in plan view. In this embodiment, light emanating from lamp 16' will not pass through the display panel directly to a user.

By constructing a liquid crystal display electronic wristwatch in accordance with the invention the overall dimension from the outside of watch case 17 to the periphery of cover glass 18 may be reduced to the dimension indicated at 17*a*. The overall dimension from the outer edge of watch case 17 to the innermost edge of the peripheral lip is indicated as 17*b*. Thus, the overall reduction in size of the wristwatch can be seen readily by comparing the relative dimensions 17*a* and 7*a*, and 17*b* and 7*b*.

Accordingly, by constructing a liquid crystal display electronic wristwatch in accordance with the invention wherein a lamp is provided in the watch case so as to be positioned directly beneath the liquid crystal display panel when viewed in plan view, a wristwatch is obtained having an overall dimension considerably smaller than could be obtained by conventional assemblies. Not only is the overall dimension of the wristwatch reduced, but by providing a reflection plate having a downwardly reflecting upper surface directly above lamp 16 provides a wristwatch having superior display illumination properties.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A liquid crystal display electronic wristwatch having a lamp therein comprising a watch case means formed with at least one opening, a liquid crystal display means positioned in said watch case means for viewing through said opening in said watch case means, said display means including an upper and a lower transparent glass plate and a liquid crystal material sealed therebetween, a reflection plate formed with an upwardly reflecting surface on the lower surface of said reflection plate positioned in said watch case means below the lower surface of said display means in plan view, and a lamp, said lamp being positioned in said case means so as to be beneath said display means and said reflection plate and to be in the peripheral portion of said display means when viewed in plan view and said reflection plate formed with a transparent portion in the lower reflecting surface in the region overlying said lamp and downwardly facing reflection means on the upper surface of said reflection plate in the region corresponding to said lamp.

2. The wristwatch of claim 1, wherein a portion of said display means is opaque in the region corresponding to said lamp in plan view.

3. The wristwatch of claim 1, wherein said watch case means includes a watch case, a cover glass positioned in said opening in said watch case means and a parting plate positioned between said watch case and said cover glass, said parting plate being formed with an opening for viewing at least a portion of said display panel in said watch case means, and said parting plate being formed and said lamp being positioned so that said parting plate overlaps said lamp in plan view.

* * * * *

65